United States Patent [19]

Gunn et al.

[11] Patent Number: 4,678,270

[45] Date of Patent: Jul. 7, 1987

[54] SUBMERSIBLE OPTICAL REPEATERS AND OPTICAL FIBRE GLANDS

[75] Inventors: Duncan A. Gunn, Saffron Walden; John C. Crownshaw, Sawbirdgeworth; Arthur A. Davis, Harrold Wood; Gilbert W. P. Colegate, Orpington, all of England

[73] Assignee: Standard Telephones and Cables Public Limited Co., London, England

[21] Appl. No.: 690,206

[22] Filed: Jan. 10, 1985

[30] Foreign Application Priority Data

Jan. 19, 1984 [GB] United Kingdom ............. 8401447

[51] Int. Cl.$^4$ .............................. G02B 6/36
[52] U.S. Cl. .............................. 350/96.20; 174/70 S; 350/96.23
[58] Field of Search ............ 350/96.20, 96.23; 174/70 S

[56] References Cited

U.S. PATENT DOCUMENTS

| 4,345,816 | 8/1982 | Nakai et al. | 350/96.20 |
| 4,357,072 | 11/1982 | Goodfellow et al. | 350/96.20 |
| 4,391,487 | 7/1983 | Melman et al. | 350/96.20 |
| 4,505,540 | 3/1985 | Furusawa et al. | 350/96.20 |

FOREIGN PATENT DOCUMENTS

| 0096580 | 12/1983 | European Pat. Off. |
| 1097433 | 1/1968 | United Kingdom |
| 2002141 | 2/1979 | United Kingdom |
| 2058484 | 4/1981 | United Kingdom |
| 2089065 | 6/1982 | United Kingdom |
| 2091901 | 8/1982 | United Kingdom |
| 2101351 | 1/1983 | United Kingdom |
| 2111243 | 6/1983 | United Kingdom |

Primary Examiner—John Lee
Attorney, Agent, or Firm—Kerkam, Stowell, Kondracki & Clarke

[57] ABSTRACT

An optical repeater for an undersea telecommunications system has a tubular casing (1) closed by a bulkhead (2) with a tail cable gland (2a) providing a common feed through for electrical power conductor (39) to power the regenerator and for optical fibres (28) for optical intelligence signals. Then the electrical power conductor and optical conductor are fed through separate glands ((40) and (32)) which facilitates manufacture and individual pressure testing prior to assembly in the regenerator.

4 Claims, 9 Drawing Figures

SUBMERSIBLE OPTICAL REPEATERS AND OPTICAL FIBRE GLANDS

BACKGROUND OF THE INVENTION

This invention relates to optical repeaters for telecommunication transmission systems, particularly for undersea systems and particularly but not exclusively to glanding arrangements for such repeaters.

In an optical undersea telecommunications system the major problems are the maintenance of a vapour and water free environment and an assembly of the electrical and optical components which facilitates manufacture and testing prior to installation.

U.K. Patent application No. 2091901A provides a sealed chamber on the front of the bulkhead and two cable glands, one through the chamber wall and one through the bulkhead, to provide a sealed environment within the repeaters and enable fibre splicing in the chamber. However this arrangement is not ideal; in particular it is difficult to see how either gland can be factory tested, other than with gas under pressure, without damaging the cable or the gland.

U.S. Pat. No. 4,345,816 shows an optical fibre introducing equipment for an optical submerged repeater and teaches the use of a small diameter metal cylinder with an insertion hole for receiving an optical fibre more than several times the diameter of the coated optical fibre, and gluing the fibre into the insertion hole with part of the coating removed. The disadvantage of this arrangement is the use of adhesive such as epoxy for withstanding the ultimate pressure differential which may occur in use of the repeater and the fact that no epoxy adhesive has yet been found, to our knowledge, which provides hermeticity to the degree required for a submerged repeater.

SUMMARY OF THE INVENTION

According to one aspect of the present invention there is provided an optical repeater comprising a tubular casing having a removable bulkhead secured to and closing an end of the casing such as to resist seabed pressures, a regenerator circuit within the casing, a power feeding circuit within the casing, a chamber secured to the bulkhead, there being an optical fibre cable sealed through one wall of the chamber where the cable enters the casing from the seaward side, there being an electrical conductor providing power feed from the cable and sealed in an electrically insulating gland through another wall of the chamber to the power feeding circuit within the casing, and an optical fibre for carrying optical signals between the cable and the regenerator circuit and sealed through a fibre gland separate from the insulating gland and removably secured in an aperture in a wall of the chamber.

According to another aspect of the present invention there is provided a gland for a coated optical fibre comprising a hollow gland body, an optical fibre guide having an inner bore which fits over the fibre and an outer wall which fits closely in the inner bore of the gland body, said guide being secured and sealed both to the fibre and to the gland body, the body having means to secure it to and through a bulkhead or the like.

According to a further aspect of the present invention there is provided an optical fibre gland comprising a gland body having a stepped bore, the smaller bore fitting a larger diameter coating on the fibre, and fibre guide parts which fit in the larger bore and which fit over a smaller diameter portion of the fibre, wherein an exposed length of the fibre can be bonded and sealed both to the fibre guide and to the gland body at one end of the body and wherein axial hydrostatic pressure on the gland will be borne substantially by reaction between the guide parts and the step in the bore.

According to yet another aspect of the present invention there is provided a method of glanding an optical fibre comprising providing a coated fibre having a smaller diameter portion and a larger diameter portion, providing a tubular gland body over the fibre, fitting over the smaller diameter portion an optical fibre guide, assembling the guide inside the larger bore and sealing and bonding the guide to the optical fibre and to the gland body so that in use hydrostatic pressure on the gland will be borne substantially by reaction between the guide and the gland body.

BRIEF DESCRIPTION OF THE DRAWINGS

In order that the invention can be clearly understood reference will now be made to the accompanying drawings wherein.

DESCRIPTION OF THE PREFERRED EMBODIMENTS

Figure 1:
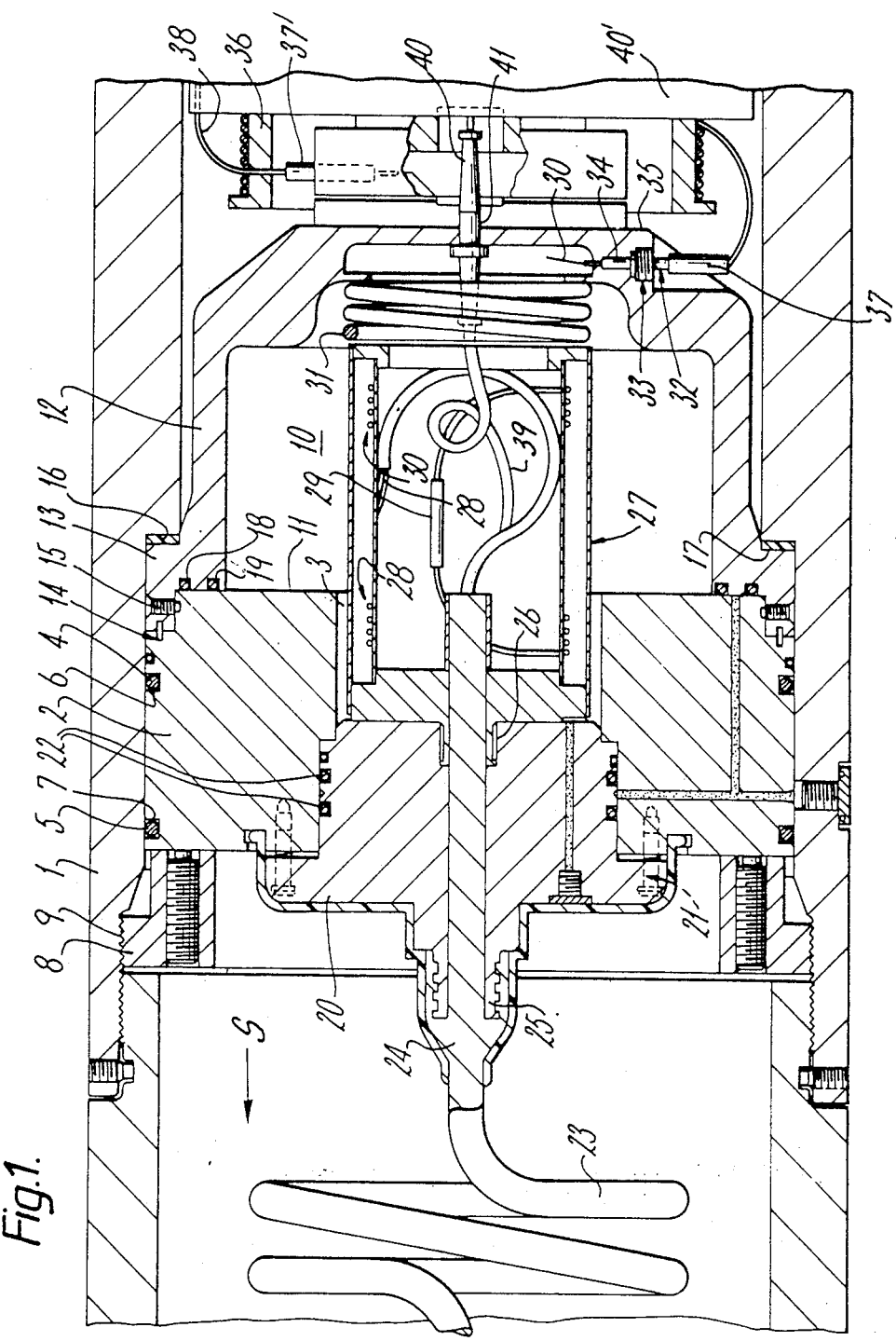
FIG. 1 shows in cross section and somewhat diagramatically an undersea optical repeater according to an embodiment of the present invention.
Figure 2A:
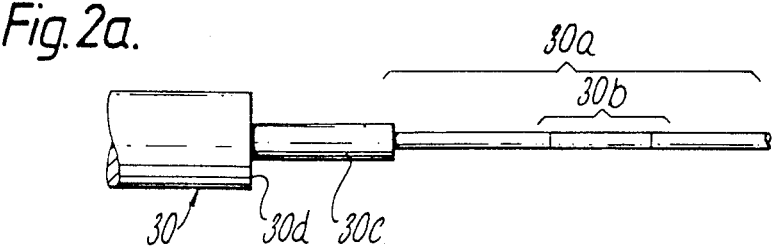
FIGS. 2a to 2d show a detail of FIG. 1.
Figure 2B:
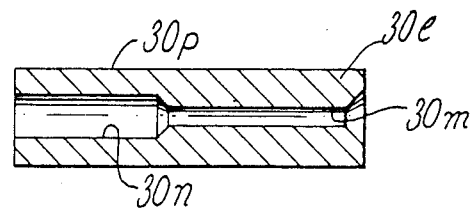
Figure 2C:
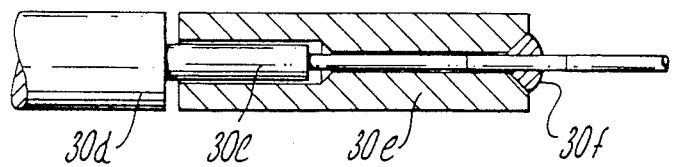
Figure 2D:
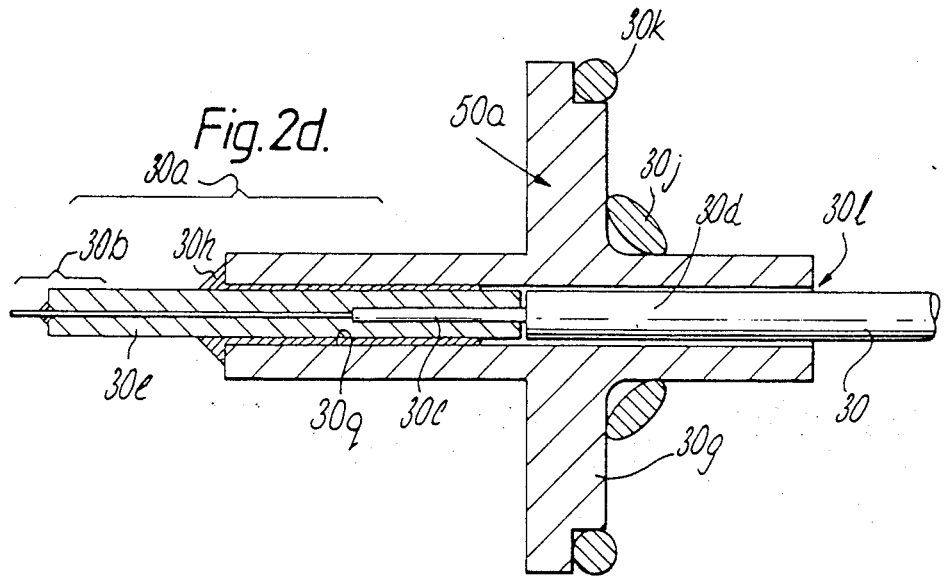

Referring to FIG. 1 of the drawings part of the tubular repeater housing is shown comprising a tubular casing 1 to which is secured a cylindrical bulkhead 2 having a central aperture 3. "O"-ring seals 4 and 5 lie in annular grooves 6 and 7 to provide a first barrier to the ingress of moisture from the seaward side S. A bulkhead retaining ring 8 is screwed at 9 into the casing 1.

A bulkhead chamber 10 is formed between the inner face 11 of the bulkhead and a cup-shaped housing 12. Housing 12 has an annular stepped flange 13 whereby it is secured both to the bulkhead 2 with pegs 14 and screws 15 and against a shoulder 16 in the casing 1. A lead gasket 17 provides a second defence against ingress of moisture from the seaward side to the interior of the casing 1 and "O"-ring seals 18 and 19 act as a second defence against ingress into pressure chamber 10.

In the central aperture 3 of the bulkhead 2 is secured a removable gland 20 by gland screws 21 and "O"-ring seals 22 lying in grooves in the cylindrical surface of gland 20. Sealed through the gland 20 is an optical fibre tail cable 23 manufactured as described in our co-pending British patent application No. 8326371 and in British Pat. No. 2058484B. A moulded cable gland 24 is moulded around a castellated spigot 25 of the gland body 20. Screwed to the gland body 20 at 26 is a fibre splice can 27 of cylindrical construction, whereon fibres 28 of the cable 23 are wound. Splices such as 29 are made between the tail cable fibres 28 and glanded fibres 30 also wound on the can 27. The glanded fibres 30 are carried in a coiled resilient plastics carrier 31 and extend through metallised fibre glands such as 32 secured to screw 33 in aperture 34 in a wall 35 of the housing 12.

An individual glanded fibre is shown more clearly in FIG. 2. On the other side of the gland 32 the fibre 30 is wound on a cylindrical bobbin 36 and spliced at 37 to a fibre tail 38 from a semiconductor laser or a photodetector diode as appropriate according to whether signals are being transmitted to the sea cable or received from a sea cable in the regenerator circuit 40', respectively.

Figure 3:
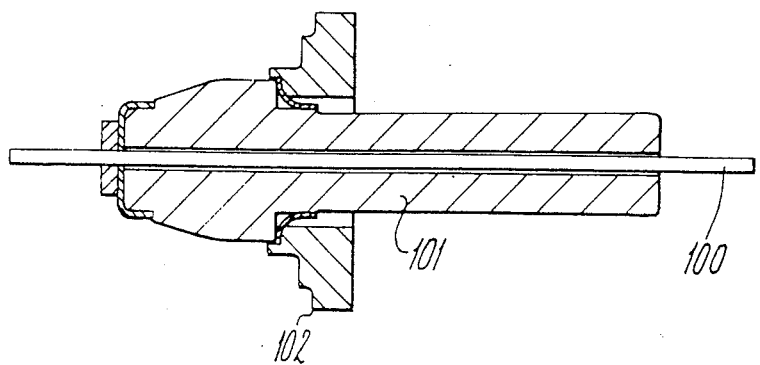
FIG. 3 shows another detail of FIG. 1.

A power feed is established from the electrical conductor 39 of the tail cable 23, coiled inside the coiled optical fibres 31 and connected to a testable power feed gland 40 sealed centrally through the wall 35 of the housing 12. This gland is shown in detail in FIG. 3 and comprises a copper electrode 100 sealed in a ceramic electrical insulator 101 and a metal flange 102 sealed on to the insulator 101. Ceramic metallisation and brazing are used to seal and secure the gland body through the central aperture 41 in a wall 35 of housing 12, and to secure the parts of the gland together before securing it through the wall 35.

Figure 5:
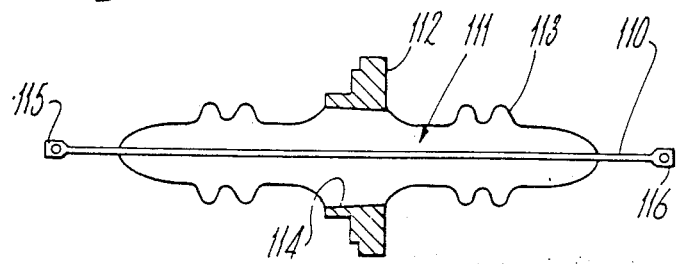
FIG. 5 shows an alternative power feed gland to the one shown in FIG. 3.

An alternative glass/metal sealed gland for the power lead-through is shown in FIG. 5. Referring to FIG. 5 the gland comprises a metal flange 112 and a metal electrical power conductor 110. These two parts are sealed to a moulded glass insulator 111 which has convolutions 113 to increase the breakdown voltage/physical length ratio. The inner aperture 114 of the flange is slightly tapered, the taper widening towards what will be the high pressure side of the repeater. Tag-like connection ends 115 and 116 provide for connection to the sea cable on the high pressure side (115) and the power module inside the repeater on the lower pressure side (116). The metal parts are made of e.g. Kovar (Trade Mark) which has a thermal expansion characteristic which substantially matches that of the glass insulator.

Referring now to FIG. 2 the fibre gland 32 is made as follows. An optical fibre 30 (FIG. 2a) is stripped of its primary and secondary coatings 30c and 30d over a region 30a of 50 mm and metallised over a portion 30b of that length. An optical fibre guide 30e (FIG. 2b) is placed over the fibre so that region 30b coincides with one end of guide 30e as shown in FIG. 2c, the bore 30m of the guide being only slightly larger than the fibre to ensure good alignment and having a counter bore 30n to fit over and only slightly larger than the primary coating 30c. The metallised fibre is soldered to the end of the guide with a solder fillet 30f. Then a gland body 30g is placed over the secondary coating and the guide 30e and a secondary soldering 30h is carried out using a lower temperature solder than the first soldering. An epoxy back filling 301 is also provided between the secondary coating 30d and the inner bore of the gland body 30g. The diameter of bore 30q is only slightly larger than the diameter of the secondary coating 30 and the diameter 30p of the guide.

The fibre gland described with reference to FIGS. 2a to 2d is an end fibre gland (design described by its position on the fibre). With this gland design, splice 37 (FIG. 1) is positioned as shown there adjacent the gland 32.

However, current cleave and splice techniques may allow only one attempt to achive a good splice and the development of techniques for stripping, metallising and glanding fibre remote from ends can also be used to provide a mid-fibre gland design which would be located midway along the fibre at 37' shown in dotted line.

Figure 4:
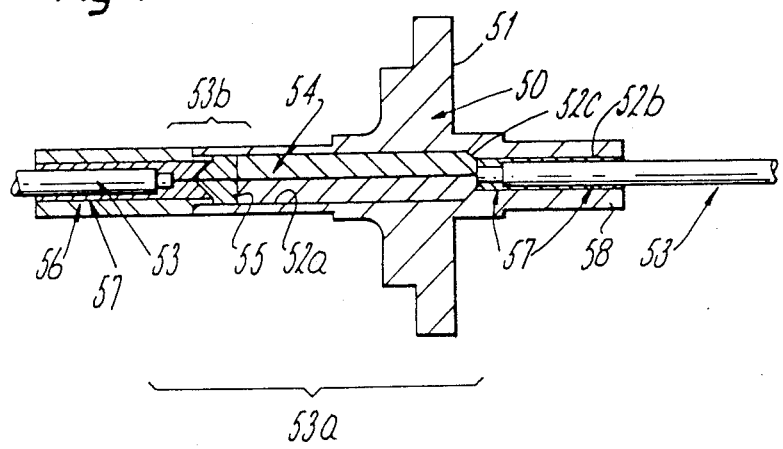
FIG. 4 shows an alternative to FIGS. 2a to 2d.

Such a design is shown in FIG. 4.

Referring to FIG. 4, here the soldered assembly is shown.

The gland body 50 has an annular flange 51 and an internal stepped bore 52a 52b with a step 52c. Bore 52b is only slightly larger than the secondary coating 53. A secondary coating fibre 53 is stripped of its secondary coating over a length 53a and its primary coating is removed over length 53b which is metallised. A split fibre guide 54 is fitted over the primary coated fibre, the two-part guide being shown in cross section in FIG. 4a, and the gland body 50 is slid over the fibre guide until the tapered end 54d abuts the tapered step 52c.

A fillet of solder 55 is applied to the metallised surface of the fibre to seal the fibre to the split guide 54 and the internal bore 52a. A gland end 56 is screwed into the soldered end of the gland body 50 and both ends 56 and 58 are flooded, where there is a small annular gap between the secondary coatings 53 and the gland body, with epoxy resin 57 to seal and secure the secondary coating at both ends into the gland. The term "bore" is herein used to include the rectangular cross section hole as well as a circular hole.

Figure 4A:
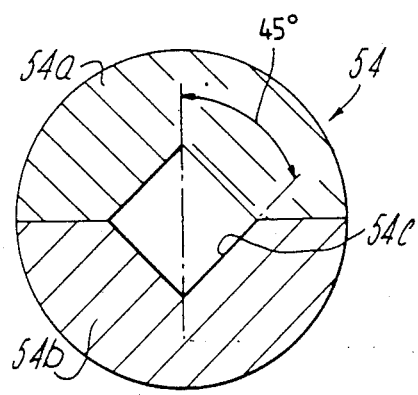
FIG. 4a shows the two part fibre guide of FIG. 4 on different and larger scales.
Figure 4B:
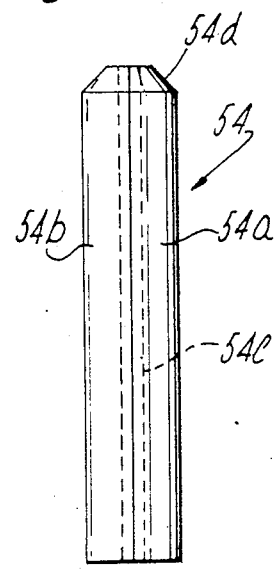

FIG. 4a shows the two-part fibre guide 54. It comprises two similar parts 54a, 54b with a square-section bore 54c and a tapered end 54d which abuts the tapered step 52c in the gland body 50. The bore 54c just fits i.e. is a sliding fit over the primary coating portion 53a, and the outer cylindrical wall if the guide is a sliding fit inside the large bore 52a of the body 50. The gland end 56 and the opposite end 58 have a small annular gap between the internal bore and the secondary coating 53, to enable the resin 57 to penetrate and flood.

This design has the advantage that the majority of the thrust generated by sea pressure (should this occur under e.g. fault condition) is transmitted through the guide 54 to the gland body at the step 52c. The solder 55 is only required to support the small proportion of thrust generated over the guide bore (or groove) cross-sectional area, and hence only a short length of fibre soldering is required. The second action of the solder is to provide a seal between guide and gland body as mentioned earlier.

A further advantage is that the length of fibre metallisation required is relatively short.

The gland body 30g or 50 is then pressure tested, prior to installation in the housing wall aperture 34 using metal and elastomeric "O"-ring seals 30j and 30k.

Both the gland body and the fibre guide are made of steel.

It is to be noted in FIG. 1 that the gland axis is radial, but it could be partially or wholly tangential with respect to the tubular casing 1 and in any event is not axial. This enables the fibre bends not to be smaller than a minimum desired radius.

The end of the fibre 30 is cleaned and spliced to another fibre 30 for splicing on to the tail cable fibre 28. Thus in all there are two fibre splices between the opto-electric device and the sea cable.

The chamber 10 is filled with a water proofing gel such as polyisobutylene.

It is an important feature that all glands are individually testable for pressure before assembly as well as after assembly as any faulty gland can individually be replaced and the fibre re-spliced without the need to disturb other fibres and glands.

We claim:

1. An optical repeater comprising a tubular casing having a longitudinal axis and a removable bulkhead assembly secured to and closing an end of the casing such as to resist seabed pressures, a regenerator circuit within the casing, said assembly defining a chamber having walls, there being an optical fibre cable sealed through one wall of the chamber, there being an electrical conductor for carrying electrical power from the cable and sealed in an electrically insulating gland through another wall of the chamber, and a coated optical fibre for carrying optical signals between the cable and the regenerator circuit and sealed through a fibre gland separate from the insulating gland and removably secured in an aperture in a wall of the chamber, said fibre gland comprising a tubular gland body having an inner bore and a mounting flange, and a rigid primary tube secured to the fibre with adhesive and secured inside the tubular gland body with adhesive, said rigid primary tube fitting closely in the inner bore of the gland body and fitting closely around said coated optical fibre.

2. A repeater as claimed in claim 1, wherein the coating of the fibre is absent over a length of the fibre within the primary tube.

3. A repeater as claimed in claim 1, wherein the primary tube comprises rigid parts which are shaped so as to fit together around the fibre.

4. A repeater as claimed in claim 1, wherein the optical fibre gland extends through the wall of the chamber more in a radial and/or tangential direction than an axial direction with respect to the casing axis.

* * * * *